Dec. 8, 1942.   M. J. SHOEMAKER   2,304,661
WATER TREATING APPARATUS
Filed Dec. 29, 1939

Inventor:
Milton J. Shoemaker
By: Jesch and Darbo
Attys.

Patented Dec. 8, 1942

2,304,661

UNITED STATES PATENT OFFICE 2,304,661

WATER TREATING APPARATUS

Milton J. Shoemaker, Madison, Wis., assignor to Research Products Corporation, Madison, Wis., a corporation of Wisconsin Application December 29, 1939, Serial No. 311,450

8 Claims. (Cl. 210—24)

This invention relates to an apparatus for withdrawing a liquid reagent from a source of supply to a point of use and simultaneously diluting it with water and preventing the flow of water into the liquid reagent supply. In ionic exchange water treating apparatus, the water to be treated is brought into contact with a bed of granular material having the property of ionic exchange, whereby ions contained in the water are exchanged for ions of the exchange material in a manner such as to effect a desired modification of the water. After the exchange material has become exhausted, it is regenerated by bringing in contact with it a dilute aqueous solution of an agent having ions which it is adapted to exchange for ions of the exchange material to restore the exchange material to its original character and composition. The invention relates particularly to improvements in apparatus and methods for bringing a liquid regenerating agent into contact with an ion exchange material. However, the invention is adapted for use in any situation where it is desired to withdraw a liquid reagent from a supply thereof and dilute it for use, and also prevent the diluting water from entering the reagent supply. For example, it may be used for bringing a liquid sterilizing agent into contact with a body to be sterilized.

The type of ionic exchange material for which the invention is especially adapted is the hydrogen exchange material which contains hydrogen cations which enter into exchange reaction with cations contained by the water to be treated. The hydrogen exchange materials are usually chemically treated fossil carbonaceous substances, such as lignite, peat, sub-bituminous coal, lignin, cellulosic or carbohydrate materials, such as wood, sawdust, grain hulls, etc., which have been subjected to chemical treatment, with an acid or a dehydrating agent, or in other manners, to develop cationic exchange properties. Among such carbonaceous cationic exchange materials which may be used are those which are commercially obtainable upon the market at the present time, under the trade marks Alkalex, Nalcite, and Zeokarb. The character of the cationic exchange material is not a part of this invention.

After such a hydrogen exchange material has become exhausted, it is regenerated by bringing in contact with it a dilute solution of a water soluble hydrolyzable acid which forms water soluble compounds with calcium and magnesium, such as sulphuric acid, hydrochloric acid, and others. Because of its relatively low cost and ready availability, sulphuric acid, in concentrated form, is used to the substantial exclusion of other acids. An example is 66° Bé. sulphuric acid, which contains approximately 93% $H_2SO_4$ by weight. For regenerating the exchange material, this acid is diluted with water to form a solution containing approximately 1% $H_2SO_4$. Heretofore, the acid has been added to the water in the form of a batch sufficient for one or more regenerations and the solution is agitated until the acid is thoroughly distributed, after which the batch is fed by gravity or otherwise to the exchange material. Such batch method of preparation is slow, inconvenient and cumbersome. It is desirable that the acid be fed directly from the primary supply to the exchange material as it is needed, and that it be diluted simultaneously to the proper concentration. In equipment of this character, it is desirable that the entrance of water into the supply of concentrated sulphuric acid be prevented under all circumstances because, as is well known, this would result in the rapid generation of heat, with the likelihood of breakage of the acid container and leakage or overflow of concentrated acid solution, with resulting serious damage or injury.

It is the object of the present invention to provide an apparatus which operates by utilizing the ordinary pressure water supply and performs the following functions simultaneously: withdraws the concentrated acid as it is needed; measures the quantity of concentrated acid being used; dilutes the acid with water to the desired concentration; feeds the resulting solution to the water treating material, and prevents the entrance of water into the supply of concentrated acid.

It is a further object of the invention to provide a system of this character which does not involve any manual mixing or handling of the acid or solution, but is carried out entirely by means of a piping and valve system of control.

Briefly, the invention embodies a method and apparatus by which the water of the pressure water supply is caused to create a suction which serves to draw concentrated acid from a primary supply container into a measuring container. The filling of the measuring container is stopped at the desired point, and the same suction is caused to effect the withdrawal of the quality of concentrated acid from the measuring container. This concentrated acid is simultaneously mixed with water from the pressure water supply to produce a solution of the desired concentration. The solution is caused to pass to the water treating material. A system of valves is provided which automatically prevents the entrance of water into the supply of concentrated acid.

Figure 1:
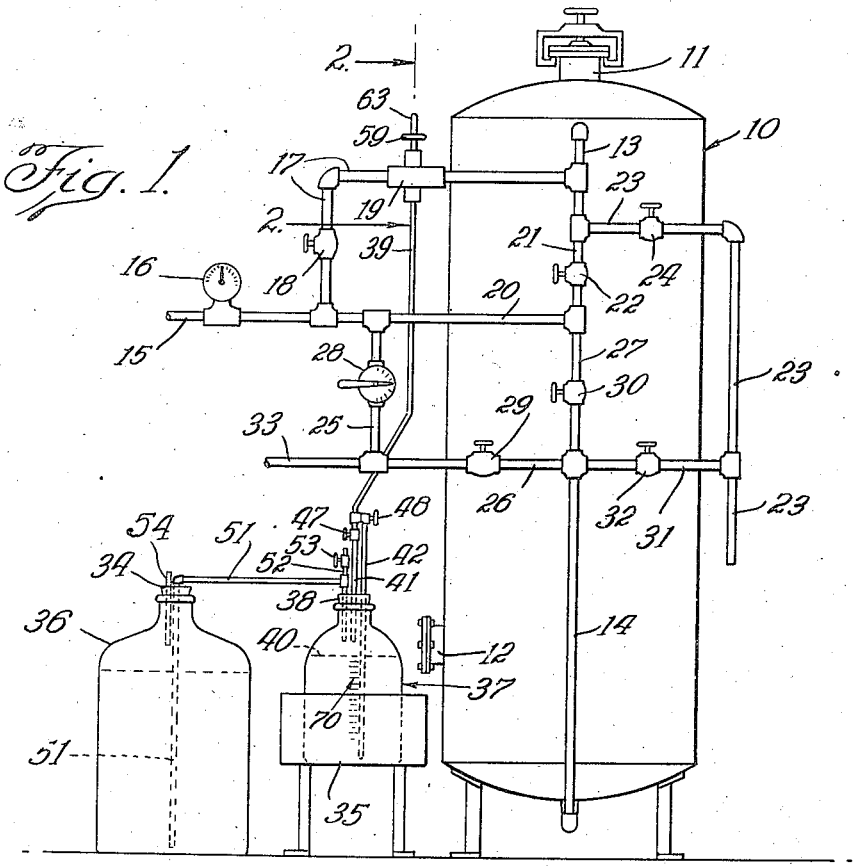
Fig. 1 is a diagrammatic plan view of the apparatus of this invention.

Referring to Fig. 1, the apparatus comprises the water treating tank 10 which contains a bed of particles of the cationic exchange material (not shown). The tank is equipped with handhole members 11 and 12 at its upper and lower portions to provide access to the interior for any servicing which may be required. The details of the tank and of the water treating material form no part of this invention, and are known and need not be described herein. A piping system is connected to the tank 10, and this comprises a pipe 13 leading to the upper portion of the tank, above the bed of water treating material. A second pipe 14 leads to the lower portion of the tank, below the bed of treating material. A pipe 15 is connected to the raw water supply, which may be the municipal pressure water system. An indicating flow meter 16 is connected in this raw water supply. A pipe 17 is connected between the raw water supply and the upper portion of the tank 10, this pipe having a valve 18 and an ejector 19 therein. The raw water supply is also connected to the upper portion of tank 10 by means of branch pipes 20 and 21, pipe 21 having a valve 22 therein. Pipe 21 has a pipe 23 connected thereto leading to the drain. Pipe 23 has a valve 24 therein. The raw water supply is connected to the lower portion of the tank 10 by means of pipes 25 and 26, and also by branch pipe 27 which is connected to pipe 20. Pipes 25, 26 and 27 have valves 28, 29 and 30 therein, respectively. Valve 28 is a flow indicating valve having an indicating dial upon its face. Pipe 14 leading to the lower portion of the tank is connected to the drain pipe 23 by means of pipe 31. Pipe 31 has a valve 32 therein. A pipe 33 is connected to the service lines, that is, the lines from which water is to be taken for use, and is connected to both pipes 25 and 26 at the junction of these two. The primary supply of concentrated acid for regenerating purposes is contained in container 36, which may be the usual heavy glass carboy in which such acid is stored and shipped. Container 36 is provided with a stopper 34, which may be of rubber or other suitable material. An acid measuring container 37 is supported upon a support 35. While the measuring container may be of acid-resisting metal, it is preferably of transparent glass so that the level of the acid therein can be readily ascertained, and the support 35 is preferably in the form of a container of acid-resistant, non-shatterable material, such as metal. Container 35 has a capacity as great as that of the measuring container 37, so that in case the latter leaks or breaks, the acid will be confined by the container 35.

Measuring container 37 is provided with a stopper 38 which is provided with three openings for the passage therethrough of pipes. Suction pipe 39 is connected between the suction inlet of ejector 19, see Fig. 2, and a point above the liquid level 40 in measuring container 37. Suction pipe 39 is divided into two branches 41 and 42, both of which extend through openings in stopper 38 of the measuring container, branch 41 ending at a point above the liquid level 40 and branch 42 extending to a point adjacent the bottom of the container. These two branch pipes are provided with valves 47 and 48 respectively. A pipe 51 connects supply container 36 with measuring container 37. This pipe passes through the stoppers of these containers and extends from a point above the liquid level in the measuring container 37 to a point adjacent the bottom of the supply container 36. A vent pipe 52 is connected to pipe 51, and is provided with a valve 53. A vent pipe 54 passes through the stopper of container 36 and vents the space above the liquid level.

Figure 2:
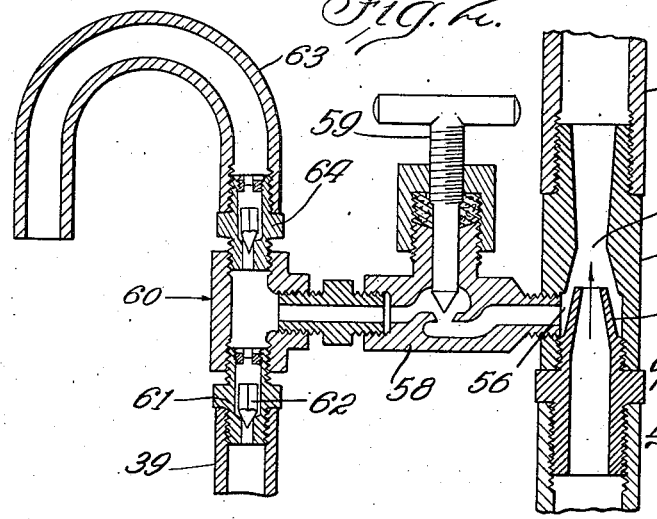
Fig. 2 is an enlarged fractional sectional view along line 2—2 of Fig. 1, with the ejector turned 90° counterclockwise (so that it indicates water flow in an upward direction instead of horizontally to the right as the flow takes place in Fig. 1).

The details of the ejector and the related piping are shown in Fig. 2. To facilitate the description, the ejector is turned 90° counterclockwise in Fig. 2. As the apparatus is shown in Fig. 1, the raw water under pressure flows through the ejector from left to right. In consequence of the turning of the ejector in Fig. 2, the flow is upwardly in Fig. 2. The ejector is connected to supply pipe 17 and comprises a constricting nozzle 55, which is surrounded by suction cavity 56. The nozzle and suction cavity both lead to the mixing chamber 57 which communicates with the continuation of supply pipe 17. A conduit member 58 is connected to the ejector 19 and communicates with the suction chamber 56 thereof. The conduit member 58 has needle valve 59 therein adapted to regulate the flow of liquid therethrough. The conduit member is connected by suitable fittings, including a T-member 60, to the suction pipe 39. A check valve 61 is located between the T-member 60 and the suction pipe 39. Check valve 61 is adapted to permit flow from the suction line to the ejector, and to prevent flow in the opposite direction. The other branch of T-member 60 is connected to waste pipe 63. A check valve 64 is provided at the entrance to waste pipe 63, and is adapted to prevent the entrance of air or water during the occurrence of suction, or vacuum, in T-member 60, and to permit flow of water to the waste in case pressure, instead of suction, occurs in T-member 60. The outlet end of waste pipe 63 is arranged to be located at a point readily visible to the operator for reasons which will be pointed out hereinafter.

The operation of the apparatus is as follows. During the time that the apparatus is in the normal water treating service, valves 18, 24, 28, 30, 32 and 59 are closed, and valves 22 and 29 are open. The raw water flows to the apparatus from supply pipe 15, through indicating meter 16, pipes 20, 21 and 13 to the top of the treating tank 10, downwardly through the treating material to the bottom of the tank, and thence through pipes 14, 26 and 33 to the service connections where the treated water is to be used.

It is stated above that valve 28 is closed during this operation, but it may be partially opened. A hydrogen exchange material reacts to form the corresponding acids from the chlorides and sulphates, etc., which may be present in the raw water. As a result, the effluent water may be slightly acid. As a general thing, the raw water contains acid-neutralizing substances, and a neutral output water may be obtained by mixing some of the raw water with the effluent, and this may be done by opening valve 28 the required amount. This valve has a dial on its face so that the amount of water which is by-passed around the treating tank is visibly indicated. Usually, the amount of raw water required to neutralize the effluent is small and produces no objectionable effect upon the treated water.

After the treating material has become exhausted so that it requires regeneration, the flow of water to service is discontinued. Usually, the first step in the regeneration cycle is to backwash the bed by passing water upwardly through it at a rate adapted to carry off the sediment which has collected upon the top of the bed, and to loosen and separate the particles of treating material. A flow rate of approximately 4 gallons per square foot of bed area per minute, or a slightly higher rate, is usually satisfactory. To accomplish the backwashing operation, valves 18, 22, 28, 29, 32 and 59 are closed (valves 18, 32 and 59 being closed from the previous operation), and valves 24 and 30 are opened. The water then flows from supply pipe 15 through pipes 20, 27 and 14 to the bottom of the treating tank, upwardly through the treating material, out of the top of the tank and through pipes 13 and 23 to the drain.

After the cleansing operation is completed, the next operation is the regeneration proper of the treating material. It is assumed that, at the beginning, the measuring container 37 is empty. Valves 18 and 32 in the main piping system are now opened, and valves 22, 24, 28, 29 and 30 are closed (valves 22, 28 and 29 being closed from the previous operation), and valves 47 and 59 in the suction system leading to the acid containers are opened and valves 48 and 53 are closed. The raw water now passes from supply pipe 15 through pipe 17, ejector 19 and pipe 13 into the top of the treating tank, downwardly through the treating material and out of the treating tank and by way of pipes 14, 31 and 23 to the drain. A suction is created within suction chamber 56 of ejector 19, and is transmitted through conduit member 58 and pipes 39 and 41 to the upper portion of measuring container 37. Check valve 64 in the waste pipe 63 is closed and forms an air seal. The suction in the measuring container 37 serves to draw concentrated acid from the supply container 36 through pipe 51 and into the measuring container 37. This is continued until the measuring container 37 has been filled to the liquid level which represents the correct amount of acid for a regeneration. Valve 47 is then closed to stop the flow of acid, and valve 53 is opened to break the vacuum and stop any flow of acid into the measuring container which may take place by a syphoning action.

Valve 48 in the suction line is then opened. The ejector then draws acid from the measuring container 37, through pipe 42. Pipe 51 and vent pipe 52 permit air to replace the withdrawn acid. This acid is mixed and diluted with raw water in the mixing chamber 57 of the ejector to a solution of the desired concentration, which may be a 1% solution, as stated heretofore. In practice, the passage of the regenerating acid through the treating material usually is regulated so as to occupy a predetermined period of time to insure complete reaction. For this purpose, the measuring container may be provided with graduations 70 so that the rate of withdrawal of acid may be regulated. The valve 18 and the flow meter 16 may be used to regulate the water flow and the concentration of the acid solution and needle valve 59 may be employed to regulate the rate of acid withdrawal. By correlating the adjustment of water flow valve 18 and acid flow valve 59, the proper rate of acid feed and concentration of solution for the regeneration is readily obtained. After the desired settings have been ascertained, they may be recorded or marked, or at least that of valve 59 may be marked, so that the correct conditions may be duplicated readily for each succeeding regeneration.

After the acid in container 37 has been withdrawn, valve 48 may be closed. In the procedure described heretofore, container 37 is filled with the proper amount of acid for one regeneration. However, it may be filled with more than this amount of acid, and in such case, it is necessary to close valve 48 when the proper amount has been withdrawn. The raw water is permitted to continue to flow at the proper rate downwardly through the bed of treating material to impel the regenerating solution through the bed ahead of it, and to rinse the bed. During this time, valve 47 may be opened again and valve 53 may be closed, to draw acid from supply container 36 in the correct amount for the next regenerating operation.

After the passage of the regenerating solution through the bed is substantially complete and only a small amount remains, the flushing may be carried out at a more rapid rate to promote the thoroughness and reduce the time of rinsing. To accomplish this, valve 22 is opened.

After the rinsing operation is completed, the apparatus is in readiness for treating water again, and the piping system is returned to the valve arrangement described first above for the normal treatment of the water and passage thereof to service.

The arrangement of check valves 61 and 64, see Fig. 2, insures that no water will be permitted to enter the container for concentrated acid. As is well known, if water is added to a body of concentrated sulphuric acid, heat is generated at a high rate, and possibly with the development of disruptive pressure. It is, therefore, important that precautions be taken to make this impossible. In the event of a condition arising in which there is pressure, instead of suction, in the suction chamber 56 of ejector 19, water under pressure is transmitted through the conduit member 58 to the T-member 60. It is prevented, however, from being transmitted to the suction pipe 39 by check valve 61. It is desirable that this pressure be relieved, and that an indication be given that the improper condition exists. For this purpose, check valve 64 and waste pipe 63 are provided. Check valve 64 permits the flow of such water into the waste pipe 63. The output end of waste pipe 63 is preferably arranged in a position such as to be visible to the operator, as is shown in the drawing, so that the operator will see the water issuing from it and will known that there is pressure upon the suction system and will take the proper steps to rectify the situation.

To illustrate with an example, during normal service valve 22 is open and valve 18 is closed. There is water under pressure in pipe 13 and this is transmitted to ejector 19 and the suction chamber 56 thereof. Needle valve 59 is normally closed, preventing the water under pressure from entering the suction piping system. Should the operator have failed to close valve 59 when initiating the service operation, the water under pressure is transmitted as far as the check valve 61, but is prevented by this valve from entering the suction pipe 39 and into the acid container 37. At the same time, check valve 64 opens to permit the flow of water through waste pipe 63 and out of the output end thereof. The operator will observe this flow, and proceed to close valve 59.

The waste outlet pipe 63 may be connected directly to the regular drain pipes of the building in which the apparatus is located, if desired, and other means may be provided for indicating to the operator that abnormal pressure conditions exist in the suction system.

The invention provides a convenient apparatus in which all steps of operation are carried out continuously by the manipulation of valves, and without any manual mixing or handling of the acid. The undesirable addition of a batch of acid to a batch of water and mixing, followed by the feeding of the batch of solution to the water treating container for a single regenerating operation, is avoided. Furthermore, the same suction apparatus which serves to withdraw acid for the regenerating function also serves to accomplish the measuring which is necessary with a liquid regenerating agent.

Another advantage of the apparatus described is that there is no danger of leakage from the acid container. In some apparatus for the feeding of regenerating acid, the acid is forced by means of pressure from the container. In the present apparatus, the interiors of the acid containers 36 and 37 are never under pressure, but are rather subjected to a vacuum, or suction, whereby the stoppers are drawn more tightly into position, and any danger of acid leakage is avoided.

Those portions of the system which are in contact with acid are composed of suitable acid resisting material. Special acid-resisting steels may be used, or steel lined with acid-resisting coatings, or metals obtainable on the market at the present time under the trade marks Monel and Everdur. Lead and glass are also suitable, and lead- and glass-lined metal may be used.

While but one embodiment of the invention has been described and illustrated, it is apparent that modifications thereof may be made within the scope of the invention. For example, the measuring container 37 may be omitted and concentrated acid may be drawn directly from the primary supply container 36 to the ejector 19. The primary supply container may, in such case, carry measuring indicia. Pipe 42 would lead to the supply container and pipes 41 and 51 would be omitted. Also, the various valves in the main piping system, such as valves 18, 22, 24, 29, 30 and 32, may be replaced by one single control valve. Single control valves of this character are known.

The tank 10 may be what is called a gravity unit, instead of a pressure unit. That is, the passage of liquid through it may be effected by gravity and not by pressure of the supply system. The effluent from the unit would, in such case be pumped, or fed by gravity, to the desired points. The apparatus of this invention is adapted for supplying regenerating liquid to such a unit.

As stated heretofore, the apparatus of the invention is adapted for other applications. It may be employed for supplying a sterilizing agent to a body. The tank 10 may contain or represent the material or body to be sterilized, and the concentrated liquid sterilizing agent may be contained in the containers 36 and 37.

I claim:

1. An exchange reaction water treating apparatus, comprising a tank containing a bed of exchange reaction material, inlet and outlet pipes connected to said tank, a source of water under pressure connected to said inlet pipe, an ejector connected in said inlet pipe, means for subjecting the suction inlet of said ejector to pressure and suction respectively, at will, a measuring container adapted to contain a liquid regenerating agent, conduit means connected to the suction inlet of said ejector and leading separately to points above and below the liquid level in said measuring container, valve means in said conduit means for transferring the suction from the upper to the lower portion of said measuring container, a supply container for said regenerating liquid, conduit means leading from a point below the liquid level in said supply container to a point above the liquid level in said measuring container, a check valve in said suction line between said ejector and said measuring container adapted to close against the flow of liquid to said measuring container, conduit means leading to waste connected to said suction line between said ejector and said check valve, a check valve in said waste pipe and being adapted to open when pressure, instead of suction, occurs in said suction line, a valve in said suction line between said conduit means leading to waste and said ejector, and means for venting, at will, the space above the liquid in said measuring container.

2. In a water treating apparatus employing exchange reaction water treating material, inlet and outlet pipes leading to and from said exchange reaction material respectively, a source of water under pressure connected to said inlet pipe, an ejector connected in said inlet pipe, means for subjecting the suction inlet of said ejector to pressure and suction respectively, at will, a measuring container adapted to contain a liquid regenerating agent, conduit means connected to the suction inlet of said ejector and forming a suction line leading separately to points above and below the liquid level in said measuring container, a supply container for said regenerating liquid, conduit means leading from a point below the liquid level in said supply container to a point above the liquid level in said measuring container, valve means in said conduit means for transferring the suction from the upper to the lower portion of said measuring container, and valve means in said suction line between said ejector and said measuring container adapted to remain open in the presence of suction and to close automatically when pressure, instead of suction, occurs in said suction line, and means for venting, at will, the space above the liquid in said measuring container.

3. The apparatus of claim 2 in which the measuring container is of transparent glass and is contained in a second container of non-shatterable composition.

4. Apparatus for supplying a liquid reacting agent to a point of use, comprising inlet and outlet pipes leading to and from said point of use, a source of water under pressure connected to said inlet pipe, an ejector connected in said inlet pipe, means for subjecting the suction inlet of said ejector to pressure and suction respectively, at will, a closed measuring container adapted to contain a liquid reacting agent, conduit means connected to the suction inlet of said ejector and forming a suction line leading separately to points above and below the liquid level in said measuring container, valve means in said conduit means for transferring the suction from the upper to the lower portion of said measuring container, a supply container for said reacting liquid, conduit means leading from a point below the liquid level in said supply container to a point above the liquid level in said measuring container, valve means in said suction line between said ejector and said measuring container for closing against the flow of liquid in said suction line, and manually operable means for venting the space above the liquid in said measuring container.

5. In a water treatment apparatus employing exchange reaction water treating material, inlet and outlet pipes leading to and from said exchange material respectively, a source of water under pressure connected to said inlet pipe, an ejector connected in said inlet pipe, means for subjecting the suction inlet of said ejector to pressure and suction respectively, at will, a container adapted to contain a liquid regenerating agent, conduit means connected to the suction inlet of said ejector and forming a suction line leading to a point below the liquid level in said regenerating agent container, a check valve in said suction line between said ejector and said regenerating agent container adapted to close against the flow of liquid to said container, conduit means leading to waste connected to said suction line between said ejector and said first valve, a check valve in said waste pipe and being adapted to open upon the occurrence of pressure, instead of suction, in said suction line, and a valve in said suction line between said conduit means leading to waste and said ejector.

6. Apparatus for supplying a liquid reacting agent to a point of use, comprising inlet and outlet pipes leading to and from said point of use, a source of water under pressure connected to said inlet pipe, an ejector connected in said inlet pipe, means for subjecting the suction inlet of said ejector to pressure and suction respectively, at will, a container adapted to contain a liquid reacting agent, conduit means connected to the suction inlet of said ejector and leading to a point below the liquid level in said reacting agent container, valve means in said suction line between said ejector and said reacting agent container for closing against the flow of liquid to said container, conduit means leading to waste connected to said suction line between said ejector and said first valve, and valve means in said waste pipe adapted to remain closed in the presence of suction and to open automatically upon the occurrence of pressure, instead of suction, in said suction line.

7. Apparatus for supplying a liquid reacting agent to a point of use, comprising an inlet pipe leading to said point of use, a source of water under pressure connected to said inlet pipe, an ejector connected in said inlet pipe and adapted to feed liquid into said inlet pipe by suction, a closed secondary supply container adapted to contain a liquid reacting agent, conduit means connected to the suction inlet of said ejector and forming a suction line leading separately to points above and below the liquid level in said secondary supply container, valve means in said conduit means for transferring the suction from the upper to the lower portion of said secondary supply container, a primary supply container for said reacting liquid, conduit means leading from a point below the liquid level in said primary supply container to a point above the liquid level in said secondary supply container, valve means in said suction line between said ejector and said secondary supply container for closing said suction line at will against the flow of liquid therein, and manually operable means for venting the space above the liquid in said secondary container.

8. Apparatus for supplying a liquid reacting agent to a point of use, comprising an inlet pipe leading to said point of use, a source of water under pressure connected in said inlet pipe, an ejector connected in said inlet pipe and adapted to feed liquid into said inlet pipe by suction, a closed secondary supply container adapted to contain a liquid reacting agent, conduit means connected to the suction inlet of said ejector and forming a suction line leading separately to points above and below the liquid level in said secondary supply container, a primary supply container for said reacting liquid, conduit means leading from a point below the liquid level in said primary supply container to said secondary supply container, valve means in said suction line for transferring the suction from the upper to the lower portion of said secondary supply container, valve means in said suction line between said ejector and said secondary supply container for closing against the flow of liquid in said suction line, and manually operable means for venting the space above the liquid in said secondary container.

MILTON J. SHOEMAKER.